United States Patent
Kim

(10) Patent No.: US 8,886,374 B2
(45) Date of Patent: Nov. 11, 2014

(54) TORQUE CONTROL METHOD FOR HYBRID ELECTRIC VEHICLE

(75) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 1299 days.

(21) Appl. No.: 12/288,776

(22) Filed: Oct. 23, 2008

(65) Prior Publication Data

US 2009/0234524 A1 Sep. 17, 2009

(30) Foreign Application Priority Data

Mar. 14, 2008 (KR) .................. 10-2008-0023610

(51) Int. Cl.
| | |
|---|---|
| *B60L 11/00* | (2006.01) |
| *B60W 10/06* | (2006.01) |
| *B60K 6/48* | (2007.10) |
| *B60W 10/08* | (2006.01) |
| *B60W 10/02* | (2006.01) |
| *B60W 50/029* | (2012.01) |
| *B60W 20/00* | (2006.01) |

(52) U.S. Cl.
CPC .............. *B60W 10/02* (2013.01); *B60W 10/06* (2013.01); *B60W 2540/10* (2013.01); *B60K 6/48* (2013.01); *Y02T 10/48* (2013.01); *B60L 2240/486* (2013.01); *Y02T 10/6286* (2013.01); *Y02T 10/6221* (2013.01); *B60W 10/08* (2013.01); *B60L 2240/423* (2013.01); *B60W 2710/0644* (2013.01); *B60W 2710/105* (2013.01); *B60W 50/029* (2013.01); *B60W 20/00* (2013.01); *B60W 2710/083* (2013.01); *Y02T 10/642* (2013.01)
USPC ............ 701/22; 310/177; 310/184; 180/65.2; 180/65.4; 123/179.4; 303/191; 290/1 A; 290/38 R; 244/57; 60/203.1; 60/793; 477/5; 477/115; 477/176; 165/140

(58) Field of Classification Search
USPC .................. 310/177, 184; 180/65.2, 65.4; 123/179.4; 303/191; 290/1 A, 38 R; 244/57; 60/203.1, 793; 477/5, 115, 477/176; 165/140
See application file for complete search history.

(56) References Cited

U.S. PATENT DOCUMENTS

| 2002/0047451 A1* | 4/2002 | Weimer ..................... 310/184 |
| 2002/0117339 A1* | 8/2002 | Nakashima ................. 180/65.4 |

(Continued)

FOREIGN PATENT DOCUMENTS

| JP | 2005-162142 A | 6/2005 |
| JP | 2006-022790 A | 1/2006 |

(Continued)

OTHER PUBLICATIONS

Definition of "Torque Converter" in Access Science Encyclopedia, 2 pages, published by McGraw Hill Companies.*

*Primary Examiner* — James Trammell
*Assistant Examiner* — Sanjeev Malhotra
(74) *Attorney, Agent, or Firm* — Edwards Wildman Palmer LLP; Peter F. Corless

(57) ABSTRACT

The present invention provides a torque control method for an HEV, the method comprising: detecting an operation failure of an integrated starter-generator (ISG); calculating a driver demand torque based on a current accelerator position sensor (APS); controlling the hydraulic pressure and operation of a clutch so as to increase an engine speed to convert the driving mode of the vehicle from electric vehicle (EV) mode to hybrid electric vehicle (HEV) mode in the event that an operation failure of the ISG is detected and the driver demand torque is out of a predetermined range; and compensating the driver demand torque to a desired level based on a transfer torque from the clutch to a motor. The method can improve driving performance and power performance of HEV, in the event of ISG failure, by performing a hydraulic control for a clutch and calculating a driver request torque and a transfer torque from the clutch to a motor to compensate the drive request torque to a desired level.

4 Claims, 7 Drawing Sheets

(56) References Cited

U.S. PATENT DOCUMENTS

| | | | |
|---|---|---|---|
| 2003/0006076 A1* | 1/2003 | Tamor | 180/65.2 |
| 2003/0127930 A1* | 7/2003 | Mackulin et al. | 310/177 |
| 2004/0206325 A1* | 10/2004 | Momcilovich et al. | 123/179.4 |
| 2005/0017580 A1* | 1/2005 | Cikanek et al. | 303/191 |
| 2006/0012177 A1* | 1/2006 | Hoppe | 290/1 A |
| 2006/0180703 A1* | 8/2006 | Zielinski et al. | 244/57 |
| 2006/0260323 A1* | 11/2006 | Moulebhar | 60/793 |
| 2007/0101696 A1* | 5/2007 | Dooley | 60/203.1 |
| 2007/0102206 A1* | 5/2007 | Lee | 180/65.2 |
| 2007/0163821 A1* | 7/2007 | Ogata | 180/65.2 |
| 2008/0045382 A1* | 2/2008 | Kawasaki et al. | 477/115 |
| 2008/0093863 A1* | 4/2008 | Roh | 290/38 R |
| 2009/0025913 A1* | 1/2009 | Zielinski et al. | 165/140 |
| 2009/0143189 A1* | 6/2009 | Hasegawa et al. | 477/5 |
| 2009/0233766 A1* | 9/2009 | Kadota | 477/176 |

FOREIGN PATENT DOCUMENTS

| | | |
|---|---|---|
| JP | 2007-055291 | 3/2007 |
| JP | 2007-069789 | 3/2007 |
| JP | 2007-131071 | 5/2007 |
| KR | 10-2007-0038878 A | 4/2007 |
| KR | 10-2007-0049069 A | 5/2007 |

* cited by examiner

TORQUE CONTROL METHOD FOR HYBRID ELECTRIC VEHICLE

CROSS-REFERENCE TO RELATED APPLICATION

This application claims under 35 U.S.C. §119(a) the benefit of Korean Patent Application No. 10-2008-0023610 filed Mar. 14, 2008, the entire contents of which are incorporated herein by reference.

BACKGROUND (a) Technical Field

The present invention relates to a torque control method for a hybrid electric vehicle (HEV), which can improve driving performance and power performance, in the event of integrated starter-generate (ISG) failure, by performing a hydraulic control for a clutch and calculating a driver request torque and a transfer torque from the clutch to a motor to compensate the drive request torque to a desired level.

(b) Background Art

A hybrid electric vehicle (HEV) employs a motor drive source as an auxiliary power source as well as an internal combustion engine to provide a reduction in exhaust gas and an improvement in fuel efficiency. As shown in FIG. 1, the HEV has a structure in which an engine 10, a motor 20, and an automatic transmission 30 are arranged in a line.

In detail, the engine 10, the motor 20, and the automatic transmission 30 are directly connected, the engine 10 and the motor 20 are connected by an engine clutch 50 to transmit power, and an integrated starter-generator (ISG) 40 is mounted to the engine 10.

The motor 20 is used to start the vehicle upon initial start-up. When the vehicle reaches a predetermined speed, the generator, i.e., the ISG 40, starts the engine 10, and thus the outputs of the engine 10 and the driving motor 20 are used simultaneously.

In particular, the HEV may run in electric vehicle (EV) mode, which is directed to a purely electric vehicle mode using only the power of the motor 20, in hybrid electric vehicle (HEV) mode, which is an auxiliary mode using the rotational force of the motor 20 as an auxiliary power source with the use of the rotational force of the engine 10 as a main power source, and in regenerative braking (RB) mode, in which the braking energy or inertia energy of the vehicle produced by braking or during driving by inertia is recovered by power generation of the motor 20 and charged in a battery. Mode conversion from the EV mode to the HEV mode is performed during start-up of the engine 10 by the ISG 40.

In implementing the logic for the respective driving modes of such an HEV, the control logic for calculating a driver demand torque during initial acceleration of the vehicle should accurately reflect a driver's intention. If the driver's intention is not sufficiently reflected in calculating the driver demand torque, the vehicle may be driven against the driver's intention, which may result in a deterioration of driving performance and an increase in the risk of an accident.

Accordingly, the accuracy of the driver demand torque calculation is essentially required for the control logic implementation of the HEV.

However, in the event of failure of the ISG 40, the engine start-up is not easy. Although the engine start-up is available by clutch slip (friction start) in the above state, the driving performance may be deteriorated and further the acceleration performance of the vehicle may be deteriorated.

Accordingly, a separate control method for the mode conversion is required to utilize the engine power in the event of ISG failure without any problem.

As a conventional method for satisfying the above requirement, a method of starting up an engine (friction start) using friction of an engine clutch during driving has been proposed. However, the method only aims at starting up the engine by hydraulic profile modeling of the engine clutch, and drag generated by a transfer torque of the engine clutch during start-up is not compensated, thus deteriorating the driving performance and acceleration performance of the vehicle.

As another conventional method, a method of starting up an engine by a motor has been proposed, differently from the friction start for starting up the engine using the friction of the engine clutch during driving. However, the method has the same drawback in that the drag generated by the transfer torque of the clutch is not compensated.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides a torque control method for a hybrid electric vehicle, the method comprising: detecting an operation failure of an integrated starter-generator (ISG); calculating a driver demand torque based on a current accelerator position sensor (APS); controlling the hydraulic pressure and operation of a clutch so as to increase an engine speed to convert the driving mode of the vehicle from electric vehicle (EV) mode to hybrid electric vehicle (HEV) mode in the event that an operation failure of the ISG is detected and the driver demand torque is out of a predetermined range; and compensating the driver demand torque to a desired level based on a transfer torque from the clutch to a motor.

In a preferred embodiment, the process of controlling the hydraulic pressure and operation of the clutch comprises: feedback controlling the hydraulic pressure of the clutch to cause clutch slip; increasing the engine speed to an injection RPM through the clutch slip and then releasing the engagement of the clutch by reducing the hydraulic pressure of the clutch; and engaging the clutch to synchronize rotational speeds of both the engine and the motor and increasing the hydraulic pressure of the clutch to the maximum to enable the vehicle to drive in HEV mode.

In another preferred embodiment, the process of controlling the hydraulic pressure and operation of the clutch comprises: feedback controlling the hydraulic pressure of the clutch to cause the clutch slip; increasing the engine speed to the injection RPM through the clutch slip and performing the fuel injection operation of the engine; and increasing the hydraulic pressure of the clutch to the maximum to enable the vehicle to run in HEV mode when the rotational speeds of both the engine and the motor are synchronized with each other during continuous slip operation of the clutch.

In still another preferred embodiment, the process of controlling the hydraulic pressure and operation of the clutch comprises: feedback controlling the hydraulic pressure of the clutch to cause the clutch slip; increasing the engine speed to the injection RPM through the clutch slip; performing fuel injection operation of the engine when the rotational speeds of both the engine and the motor are synchronized with each other during the continuous slip operation of the clutch; and increasing the hydraulic pressure of the clutch to the maximum to enable the vehicle to run in HEV mode.

In yet another preferred embodiment, the process of compensating the driver demand torque comprises: calculating the transfer torque from the clutch to the motor during the clutch slip operation; and compensating a motor torque in accordance with the calculated transfer torque.

In still yet another preferred embodiment, the transfer torque of the clutch is calculated by adding a coulomb friction transfer torque (Tc) and a viscous friction transfer torque (Tv), and the coulomb friction transfer torque (Tc) and the viscous friction transfer torque (Tv) are calculated by the following formulas 1 and 2:

$$Tc = nf \times mu \times Ap \times (Ps - Pn) \times \mathrm{bar} 2N/m^2 \times Rm \times sgn(\Delta \mathrm{rpm}) \quad \text{[Formula 1]}$$

$$Tv = f(\Delta \mathrm{rpm}, Ps, ATF \text{ Temp}): \text{Experimental values are reflected.} \quad \text{[Formula 2]}$$

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
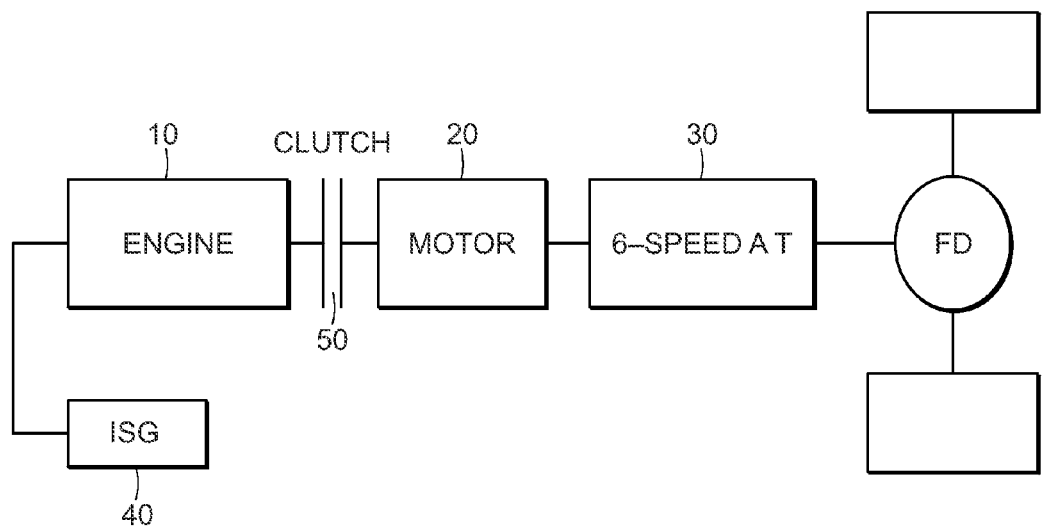
FIG. 1 is a system configuration diagram of a hybrid electric vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 2:
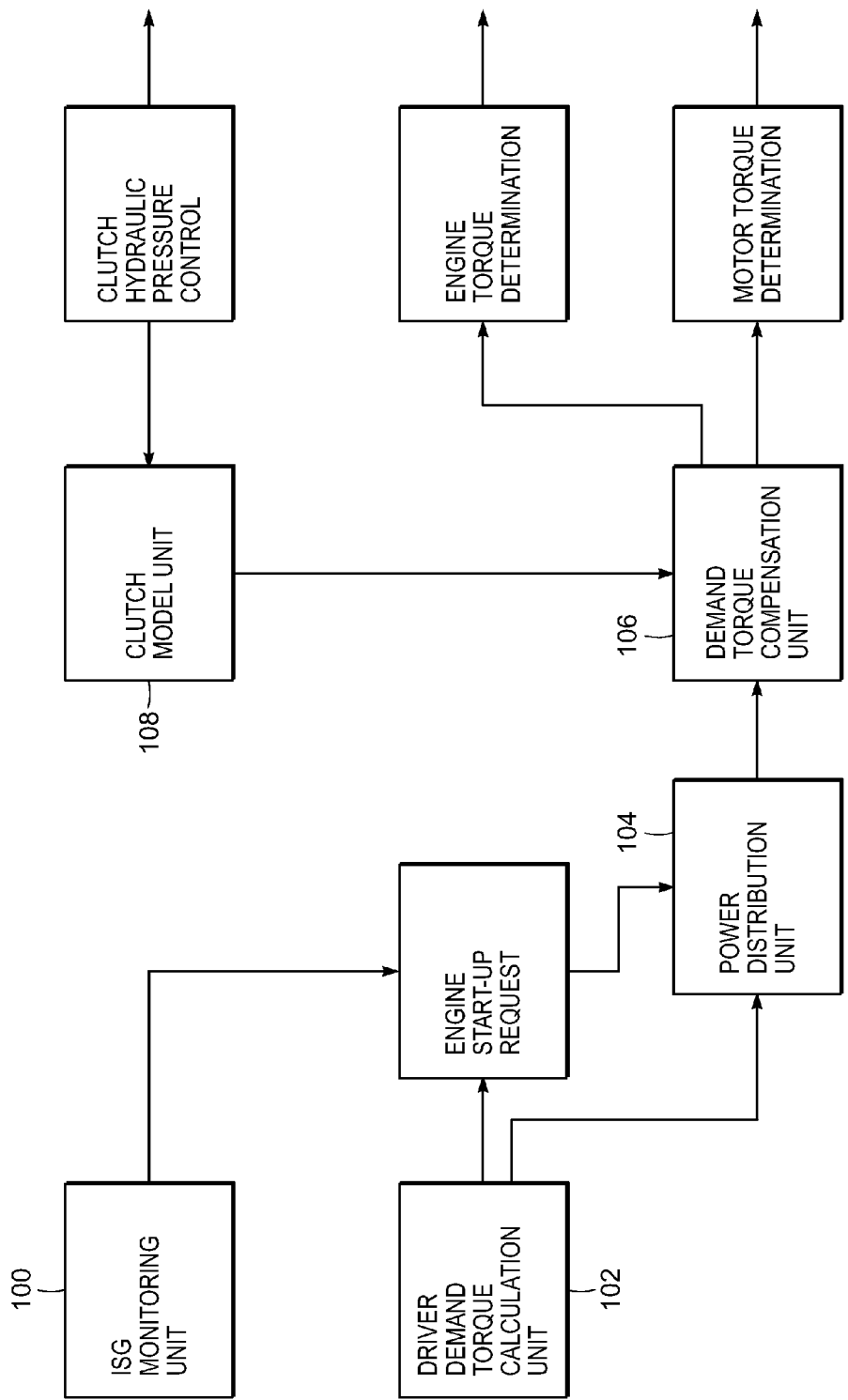
FIG. 2 is a control block diagram for torque control of a hybrid electric vehicle in accordance with the present invention.
Figure 3:
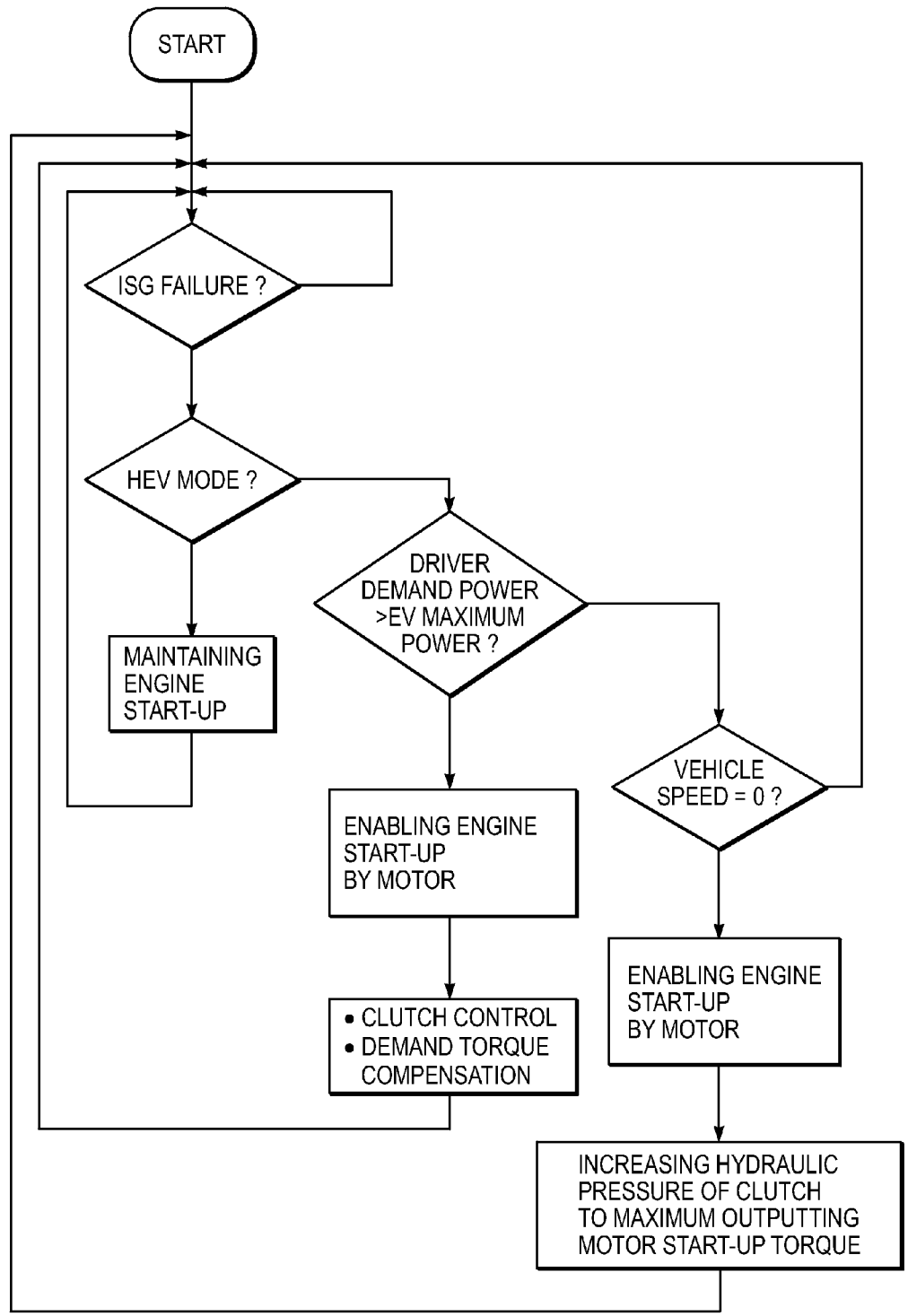
FIG. 3 is a flowchart illustrating a torque control method for a hybrid electric vehicle in accordance with the present invention.

FIG. 2 is a control block diagram for torque control of a hybrid electric vehicle in accordance with the present invention, and FIG. 3 is a flowchart illustrating a torque control method for a hybrid electric vehicle in accordance with the present invention.

The torque control of the hybrid electric vehicle in accordance with the present invention is a logic performed in the event of ISG failure. As shown in FIG. 2, the means for implementing the logic includes an ISG monitoring unit 100, a driver demand torque calculation unit 102, a power distribution unit 104 for distributing power during the mode conversion based on an engine start request, a demand torque compensation unit 106 for compensating a driver demand torque to a desired level, and a clutch model unit 108 for controlling hydraulic pressure of a clutch.

The ISG monitoring unit 100 is a failure detection sensor for detecting an ISG operation failure cause by excessive temperature of the ISG.

The driver demand torque calculation unit 102, the power distribution unit 104, and the demand torque compensation unit 106 are operating elements included in a hybrid control unit (HCU), which is a main controller of the hybrid electric vehicle. As torque compensation values by the demand torque compensation unit 106, an engine torque determination value and a motor torque determination value are transmitted to an engine control unit (ECU) and a motor control unit (MCU), respectively, to perform the torque compensation.

The torque control method for the hybrid electric vehicle of the present invention based on the control means for implementing the logic will be described below.

A hybrid electric vehicle is started in the electric vehicle (EV) mode that uses only the power of the motor. The ISG monitoring unit detects whether an operational failure of the IGS exists and it transmits a detection signal to the HCU.

At the same time, the HCU calculates a driver demand torque based on an accelerator position sensor (hereinafter abbreviated to APS). That is, when a detection value obtained by monitoring the APS is transmitted to the HCU, the driver demand torque is calculated based on the APS. In more detail, an APS opening degree is a value obtained by detecting the depression degree (depth) of an accelerator pedal and expressed as percent (%). The opening degree of the APS is monitored and, at the same time, a maximum torque and a minimum torque based on a vehicle speed are calculated, in which the minimum torque is matched to 0% of the APS and the maximum torque is matched to 100% of the APS, thus obtaining a driver demand torque based on the calculated vehicle speed and the detected APS opening degree.

As a result of the calculation of the driver demand torque, if it is determined that the mode conversion from the EV mode to the HEV mode is required as the driver demand torque value is out of a predetermined range, the engine start-up is required. That is, if the driver demand power is greater than the maximum power of the EV mode, the engine start-up is required to convert the EV mode to the HEV mode, and the engine start-up is performed by the motor connected through the engine clutch.

At this time, if the engine start-up is required together with the detection of IGS failure, the engine speed is increased by controlling the hydraulic pressure and operation of the clutch, and thus the mode conversion to the HEV mode is achieved.

Especially, during the process of controlling the hydraulic pressure and operation of the clutch, the transfer torque from the clutch to the motor is calculated to compensate the drive demand torque to a desired level based on the calculated transfer torque.

The hydraulic pressure and operation of the clutch can be controlled in various ways.

Figure 4:
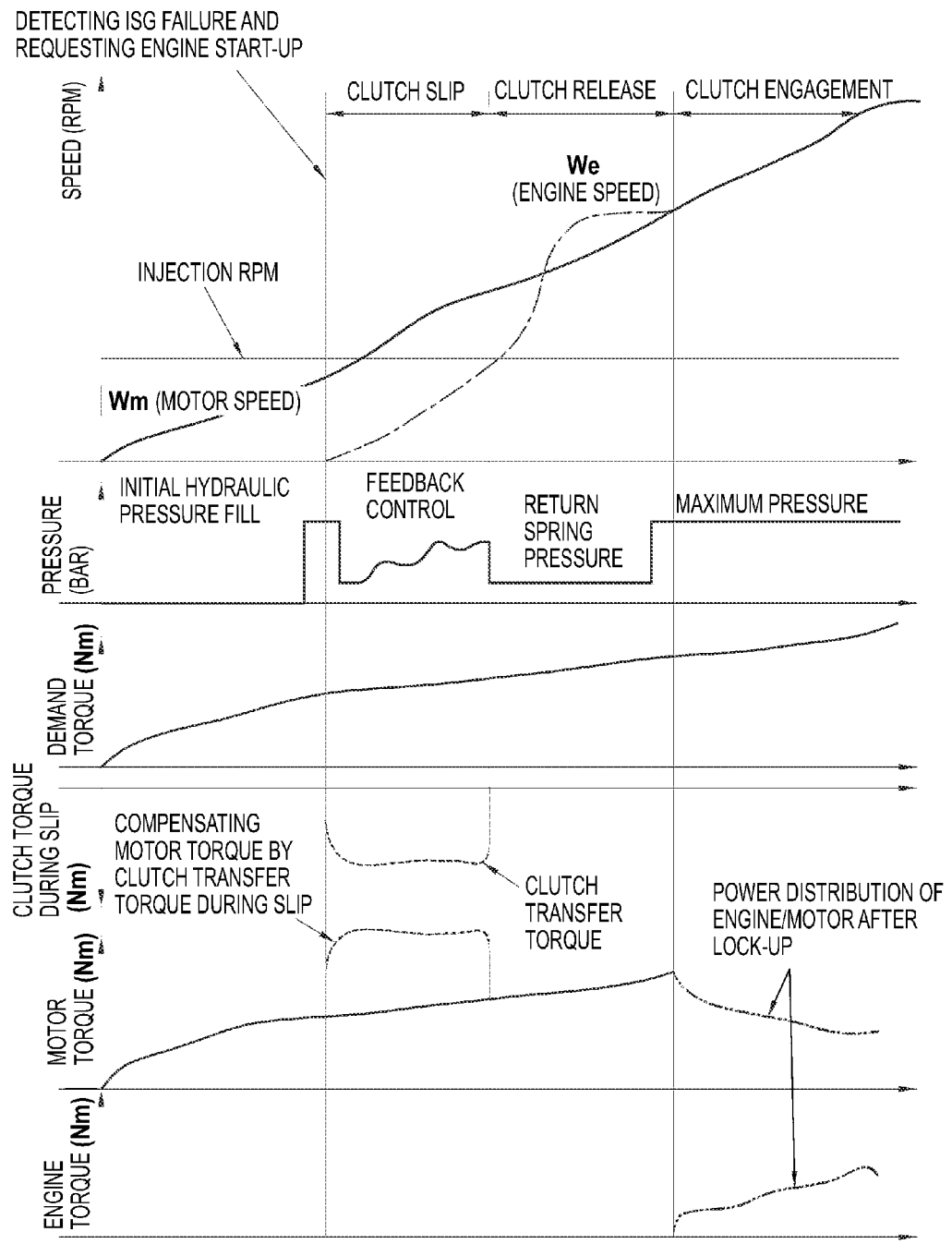
FIG. 4 shows a control sequence illustrating a torque control method for a hybrid electric vehicle in accordance with a preferred embodiment of the present invention.

Referring to FIG. 4, a first embodiment of the control method is described. First, the hydraulic pressure of the clutch is feedback controlled to cause clutch slip. That is, the hydraulic pressure of the clutch is feedback controlled so as not to exceed the maximum hydraulic pressure to cause friction start by the clutch slip.

Then, the engine speed is increased to an injection RPM through the clutch slip, and the hydraulic pressure of the clutch is reduced to release the engagement of the clutch. In more detail, the hydraulic pressure is applied against the force of a return spring included in the clutch before the fuel injection into the engine is performed until the rotational speeds of both sides of the clutch connecting the engine and the motor are synchronized with each other, thus releasing the engagement of the clutch.

Subsequently, after releasing the engagement of the clutch, the fuel injection operation of the engine is performed. Next, after the fuel injection operation of the engine, the hydraulic pressure of the clutch is increased together with an increase in the engine RPM to engage the clutch. When the rotational speeds of both sides of the engine and the motor are synchronized with each other due to the engagement of the clutch, the hydraulic pressure of the clutch is increased to the maximum, and thus the mode conversion from the EV mode to the HEV mode is performed.

According to the first embodiment, since the clutch is released for the fuel injection operation of the engine, it is possible to prevent a shock from occurring during the fuel injection operation of the engine. Moreover, since the clutch is released for the fuel injection operation of the engine, the clutch slip time is relatively reduced, and thus it is possible to maintain the durability of the clutch.

Meanwhile, the transfer torque from the clutch to the motor is calculated during the clutch slip or before the clutch engagement (full lock-up), and the driver demand torque is compensated to a desired level based on the calculated transfer torque, which will be described in more detail later.

Figure 5:
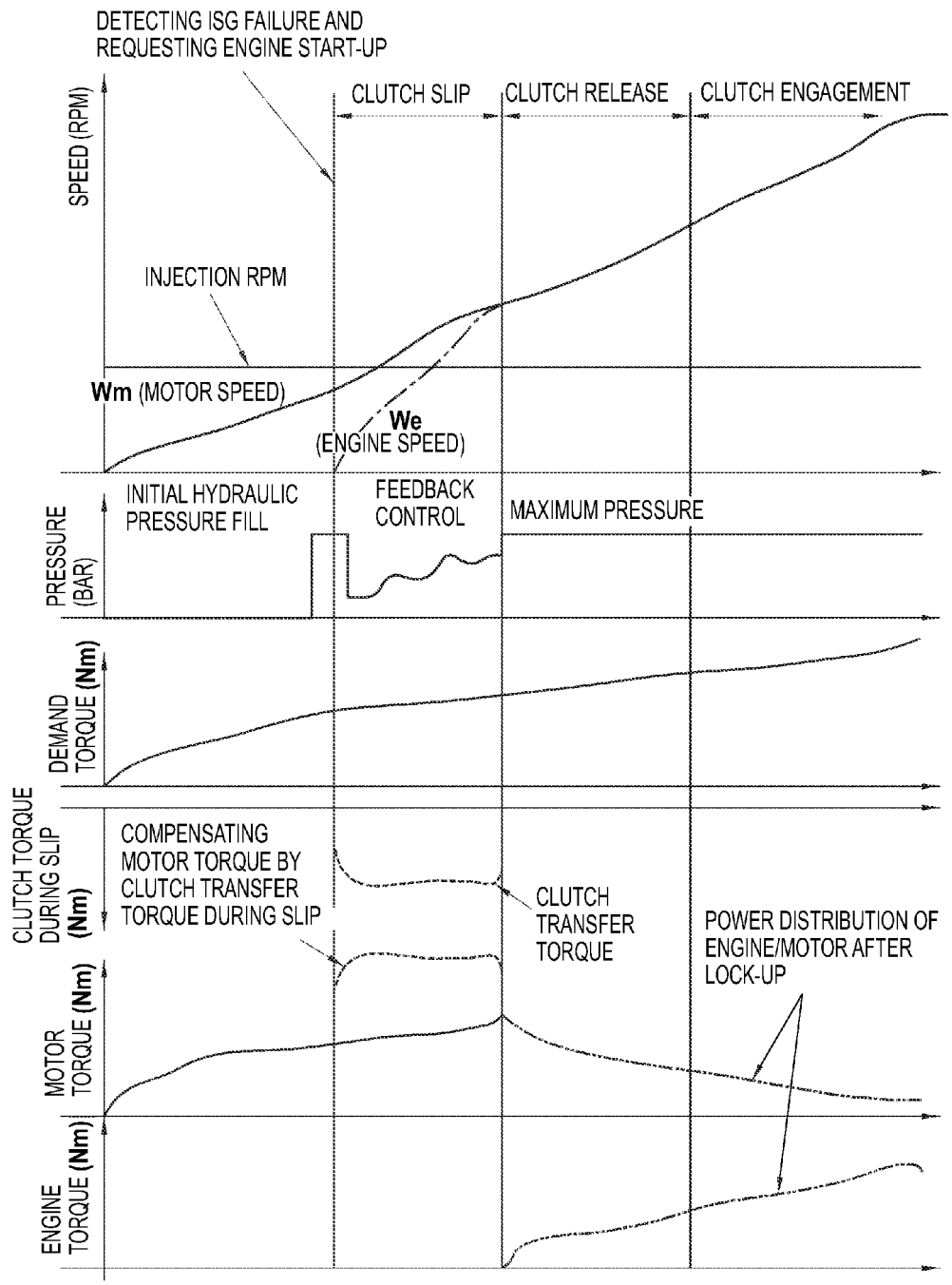
FIG. 5 shows a control sequence illustrating a torque control method for a hybrid electric vehicle in accordance with another preferred embodiment of the present invention.

Referring to FIG. 5, a second embodiment of the control method is described. First, the hydraulic pressure of the clutch is feedback controlled to cause the clutch slip in the same manner as the first embodiment. Subsequently, the engine speed is increased to the injection RPM through the clutch slip and, at the same time, the fuel injection operation of the engine is performed during the clutch slip. When the rotational speeds of both sides of the engine and the motor are synchronized with each other by the continuous slip operation of the clutch, the hydraulic pressure of the clutch is increased to the maximum, and thus the mode conversion from the EV mode to the HEV mode using both the engine and the motor is performed.

According to the second embodiment, since only the clutch slip control is performed until the clutch engagement (full lock-up), it is possible to facilitate the control without any additional sequence and the mode conversion to the HEV mode is promptly made. Moreover, since the engine injection is rapidly initiated through the clutch slip, it is possible to significantly reduce the clutch slip time, thus maintaining the durability of the clutch.

Meanwhile, the driver demand torque compensation, in which the driver demand torque is compensated based on the transfer torque from the clutch to the motor during the clutch slip, is performed the same manner as the first embodiment, and its description will be given in detail later.

Figure 6:
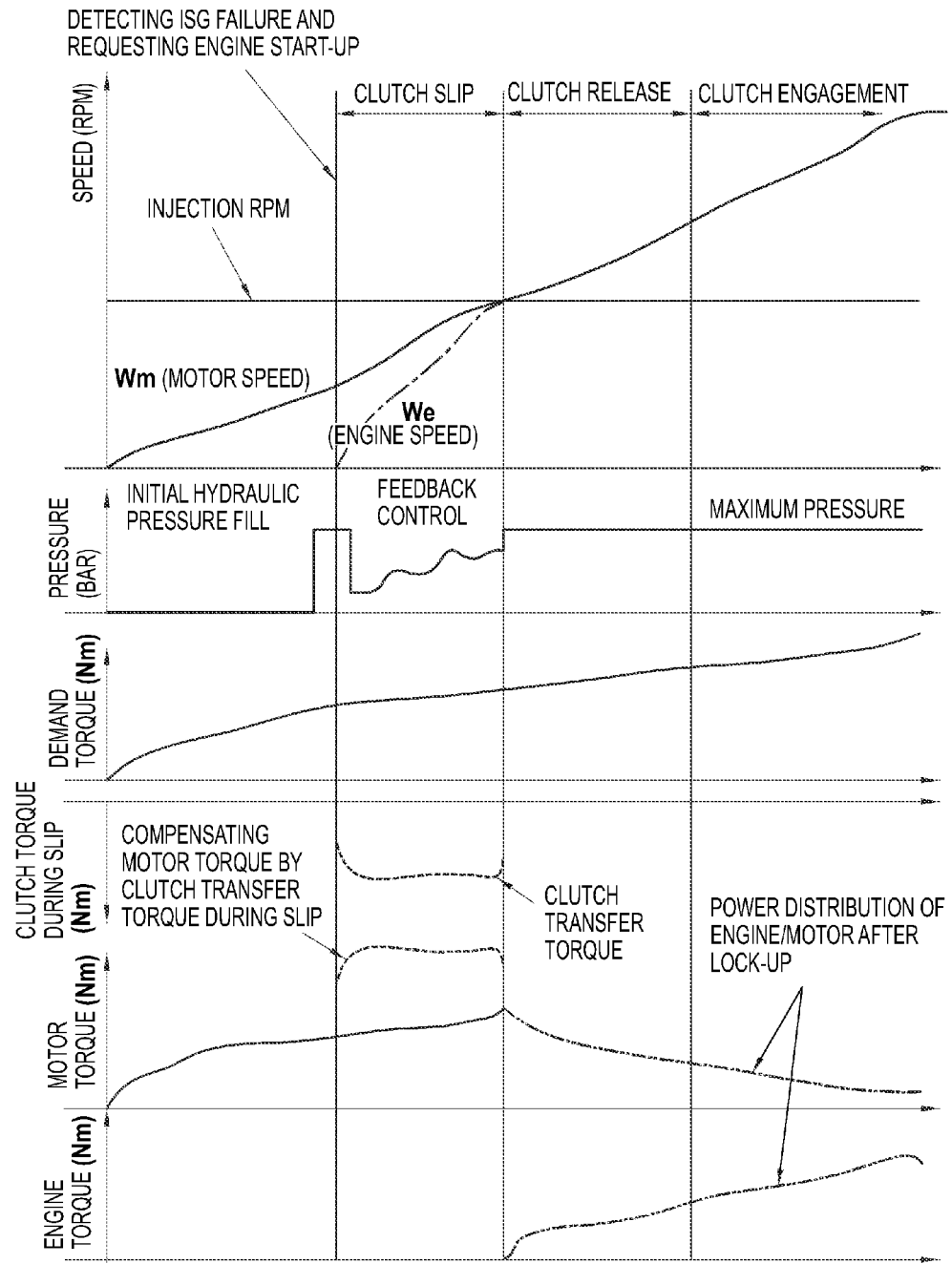
FIG. 6 shows a control sequence illustrating a torque control method for a hybrid electric vehicle in accordance with still another preferred embodiment of the present invention.

Referring to FIG. 6, a third embodiment of the control method is described. First, the hydraulic pressure of the clutch is feedback controlled to cause the clutch slip in the same manner as the first and second embodiments. The engine speed is increased to the injection RPM through the clutch slip, and the fuel injection operation of the engine is not performed before the rotational speeds of both sides of the clutch are synchronized with each other. The fuel injection operation of the engine is performed after the rotational speeds of both sides of the clutch, i.e., the rotational speeds of both the engine and the motor are synchronized with each other by the continuous slip operation of the clutch. Likewise, when the rotational speeds of both sides of the engine and the motor are synchronized with each other by the continuous slip operation of the clutch, the hydraulic pressure of the clutch is increased to the maximum, and thus the mode conversion from the EV mode to the HEV mode using both the engine and the motor is performed.

According to the third embodiment, since only the clutch slip control is performed until the clutch engagement (full lock-up), it is possible to facilitate the control without any additional sequence and the mode conversion to the HEV mode is promptly made. Especially, since the engine injection is not performed during the clutch slip, it is possible to prevent the engine torque from changing abruptly in a state where the clutch is not completely engaged.

Meanwhile, the driver demand torque compensation, in which the driver demand torque is compensated based on the transfer torque from the clutch to the motor during the clutch slip, is performed the same manner as the first and embodiments, and its description will be given in detail below.

The process of compensating the driver demand torque will be described in detail below. As described in the above respective embodiments, during the clutch slip operation, the compensation for the driver demand torque, in which the transfer torque from the clutch to the motor is calculated and the driver demand torque is compensated to a desired level based on the calculated transfer torque, is performed.

Accordingly, during the clutch slip operation, it is important to accurately calculate the transfer torque from the clutch to the motor. As the method for calculating the clutch transfer torque, a clutch transfer torque formula know in the art is used, in which parameter acquisition is performed by an experiment and a formula having an experimentally obtained viscous friction term is used to reflect the characteristics of a wet clutch. That is, the clutch transfer torque is calculated by adding a coulomb friction transfer torque (Tc) and a viscous friction transfer torque (Tv), and the coulomb friction transfer torque (Tc) and the viscous friction transfer torque (Tv) may be expressed by the following formulas 1 and 2.

$$Tc = nf \times mu \times Ap \times (Ps-Pn) \times \text{bar} 2N/m^2 \times Rm \times sgn(\Delta rpm) \quad \text{[Formula 1]}$$

$$Tv = f(\Delta rpm, Ps, ATF\ Temp): \text{Experimental values are reflected} \quad \text{[Formula 2]}$$

In formulas 1 and 2, nf represents a number of clutch friction plates, mu represents f($\Delta$rpm, ATF Temp), Ap represents an area of a hydraulic piston (m²) acting on the clutch, Ps represents a clutch pressure considering a hydraulic response (bar), Pn represents a return spring force (bar), Rm represents an effective radium (m), and bar2N/m² represents 100000 (for converting the unit of pressure into the unit of torque).

Based on formulas 1 and 2, the transfer torque from the clutch to the motor can be accurately calculated to compensate the motor torque in accordance with a negative transfer torque in the friction start by the clutch slip, thus compensating the driver demand torque to a desired level. As a result, the driving performance is improved.

Meanwhile, in the respective embodiments, the hydraulic pressure of the clutch is feedback controlled to cause the clutch slip, and thus it is preferable to set the clutch slip through the hydraulic feedback control to a target slip.

The reason for this is that, as the requirements of the target slip, the time point of the friction start (clutch slip) is changed according to the driving conditions and the delta RPM, i.e., a difference between the speeds of the engine and the motor, is also changed according to the vehicle speed. Accordingly, it is necessary to provide a structure capable of coping with such changes.

Moreover, in order to facilitate the driving performance test and prevent the deterioration of the clutch due to the clutch slip, it is necessary to facilitate the target slip calibration.

Figure 7:
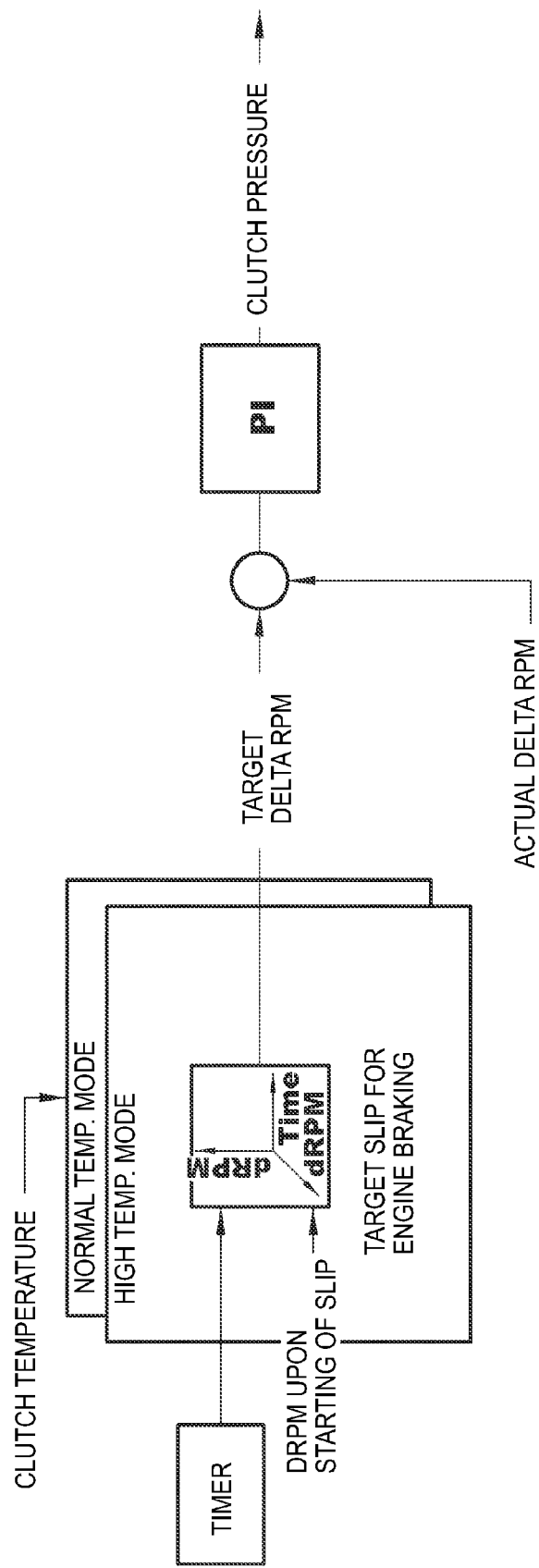
FIG. 7 is a 3D-table configuration diagram for the torque control method for the hybrid electric vehicle in accordance with the present invention.

Accordingly, as shown in FIG. 7, in setting the target slip, a three-dimensional table (3-D table) is used to set a target slip delta RPM with the passage of time and provide a Form with the passage of time with respect to delta RPMs of the slip start time point, thus making a distinction between maps according to the temperature.

As described above, according to the torque control methods of the present invention, it is possible to enable the engine start-up and the driving in the HEV mode in the event of ISG failure during driving and compensate the driver demand torque to a desired level, thus improving the driving performance and the power performance of the vehicle. Moreover, in the event of ISG failure, the torque control method of the present invention controls the hydraulic pressure of the clutch to perform the friction start by the clutch slip, and accurately calculates the transfer torque from the clutch to the motor to compensate the motor torque in accordance with a negative transfer torque of the clutch, thus improving the driving performance. Furthermore, the present methods are applicable to any kind of hybrid vehicle employing the ISG as well as to the hybrid electric vehicle depicted in FIG. 1.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A torque control method for a hybrid electric vehicle, the torque control method comprising:
    detecting an operation failure of an integrated starter-generator (ISG);
    upon detecting the operation failure of the ISG keeping a vehicle in motion once an ISG operation failure has occurred by:
    calculating a driver demand torque based on a current accelerator position sensor (APS);
    controlling a hydraulic pressure and operation of a clutch so as to increase an engine speed to convert a driving mode of the hybrid electric vehicle from electric vehicle (EV) mode to hybrid electric vehicle (HEV) mode during the clutch slip operation in the event that an operation failure of the ISG is detected and the driver demand torque is out of a predetermined range;
    compensating the driver demand torque to a desired level based on a transfer torque from the clutch to a motor;
    wherein said compensating the driver demand torque includes:
        calculating the transfer torque from the clutch to the motor during the clutch slip operation; and
        compensating a motor torque in accordance with a negative transfer torque in a friction start by the clutch slip as the calculated transfer torque; and
    wherein controlling the hydraulic pressure and operation of the clutch further comprises:
        engaging the clutch to synchronize rotational speeds of both an engine and the motor and increasing the hydraulic pressure of the clutch to a maximum to enable the hybrid electric vehicle to drive in the HEV mode.

2. The torque control method of claim 1, wherein controlling the hydraulic pressure and operation of the clutch comprises:
    feedback controlling the hydraulic pressure of the clutch to cause clutch slip;
    increasing the engine speed to an injection revolution per minute (RPM) through the clutch slip and then releasing engagement of the clutch by reducing the hydraulic pressure of the clutch.

3. The torque control method of claim 2, wherein controlling the hydraulic pressure and operation of the clutch comprises:
    increasing the hydraulic pressure of the clutch to a maximum to enable the hybrid electric vehicle to run in the HEV mode when the rotational speeds of both the engine and the motor are synchronized with each other during continuous slip operation of the clutch.

4. The torque control method of claim 2, wherein controlling the hydraulic pressure and operation of the clutch further comprises:
    performing fuel injection operation of an engine when the rotational speeds of both the engine and the motor are synchronized with each other during the continuous slip operation of the clutch; and
    increasing the hydraulic pressure of the clutch to a maximum to enable the hybrid electric vehicle to drive in the HEV mode.

* * * * *